United States Patent [19]

Frank

[11] 4,121,486
[45] Oct. 24, 1978

[54] INTERNAL THREAD CLEANER AND RESTORER

[76] Inventor: Edward Joseph Frank, R.D. #1, Box 325A, Oxford, Pa. 19363

[21] Appl. No.: 822,810

[22] Filed: Aug. 8, 1977

[51] Int. Cl.² .................... B23B 3/22; B23G 1/00; A47L 14/02

[52] U.S. Cl. .................... 82/4 C; 10/1 B; 15/236 R

[58] Field of Search .................... 82/4 C, 4 R, 1.5; 15/236 R, 236 C, 236 B, 104.03, 104.04, 104.05, 104.15; 10/1 R, 1 B

[56] References Cited

U.S. PATENT DOCUMENTS

| | | | |
|---|---|---|---|
| 1,600,927 | 9/1926 | Bryant | 10/1 B |
| 1,614,197 | 1/1927 | Hyrup | 10/1 B |
| 2,489,443 | 11/1949 | Williams | 15/236 |
| 2,616,103 | 11/1952 | Stecher | 10/1 R |

Primary Examiner—Harrison L. Hinson
Attorney, Agent, or Firm—Eugene E. Renz, Jr.

[57] ABSTRACT

Thread restoring tool which is simple, accurate and inexpensive for cleaning and restoring defective internal threads of pipe connecting members. The tool comprises a pair of levers pivotally mounted to a cross link at approximately the midpoint of the levers and thread cutting dies mounted at the outer terminal ends of the levers remote from the hand grip portions of the levers. The hand grips are initially spread apart to position the cutting dies together to permit positioning internally of the female threads of a connecting member. The hand grips are then closed to seat the cutting dies and permit tracking in the threads. Application of hand pressure and rotation of the tool causes a cutting action.

8 Claims, 7 Drawing Figures

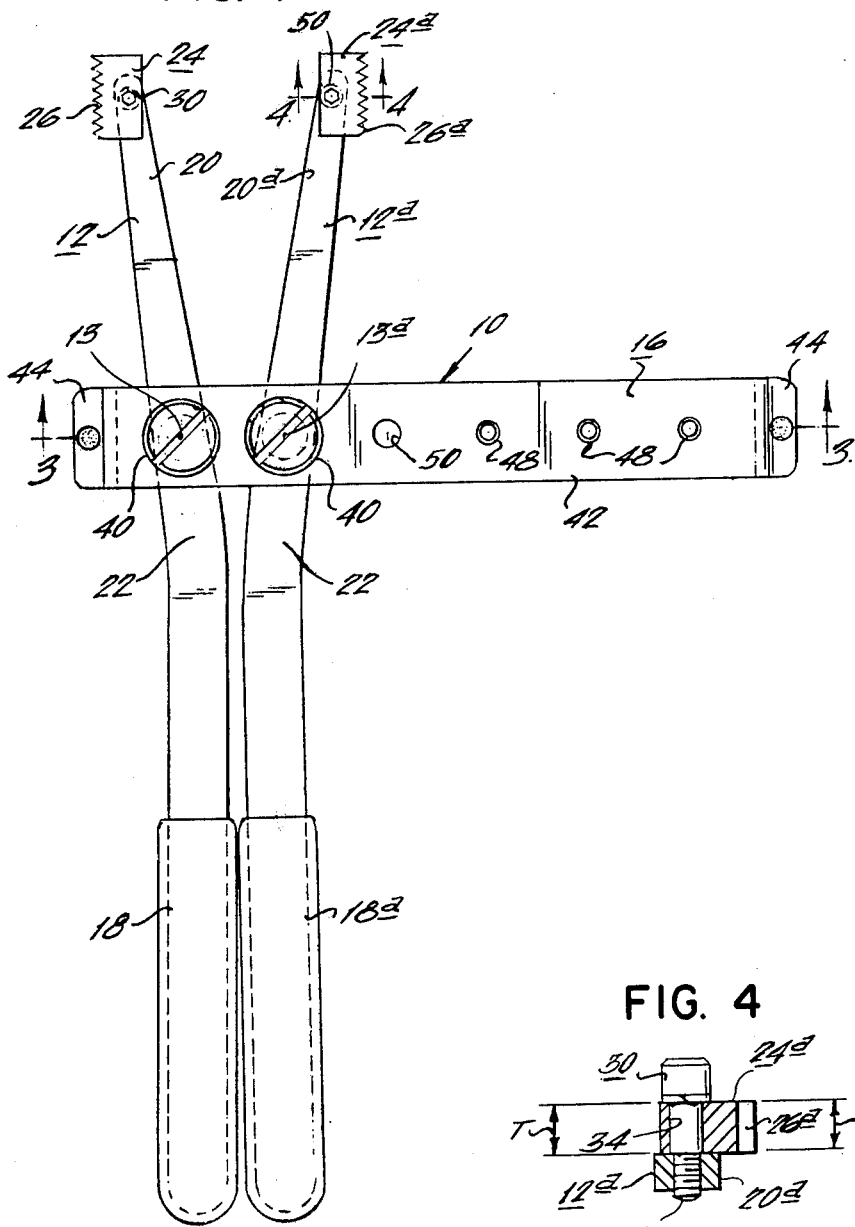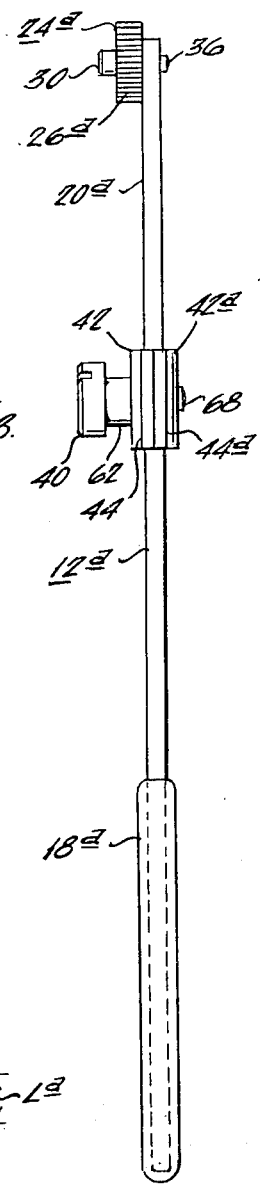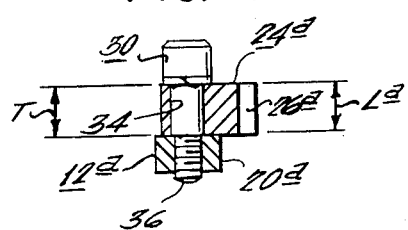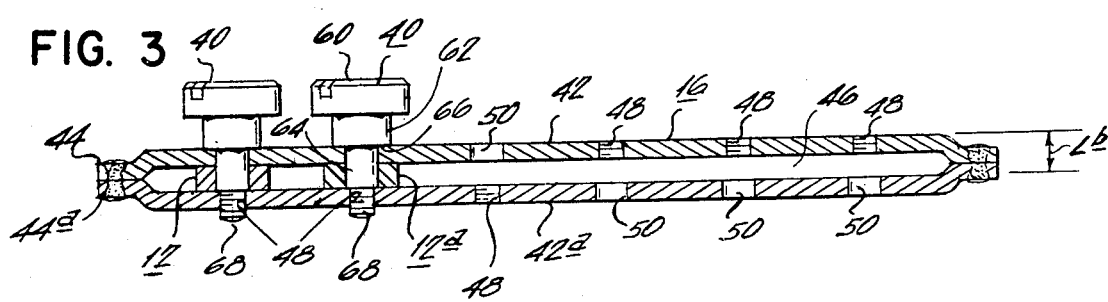

INTERNAL THREAD CLEANER AND RESTORER

BACKGROUND OF THE INVENTION

The present invention relates to a tool for cleaning and restoring internal pipe threads or the like. The tool by reason of its novel features is of relatively simplified construction and is, therefore, inexpensive to manufacture and is highly effective for the purposes intended.

Pipe systems or the like usually include internally threaded connecting elements such as elbows, T-joints and the like which in some instances are rather expensive castings. The internal threads of these castings are usually formed by a turning operation utilizing specially designed and specially made thread taps which are somewhat expensive. Often times in handling the pipe connecting elements on a site, or in the packing and shipping of these elements, the threads are bruised or buggered with the result that the male pipe elements cannot be assembled thereto. In some instances, the connecting elements and pipe for a system are delivered to a site and are exposed to atmospheric conditions for a prolonged period causing rusting of the threads. In some instances, it has been found that the rust build up prevents assembly of the pipe to the connecting elements. This of course necessitates retapping the connecting elements or recutting the male pipe threads. In most instances, the tap for the threads can only be accommodated on special turning equipment and, thus, reworking these threads usually necessitates sending the casting back to the manufacturing source which is time consuming and expensive. In some instances, it may even be necessary to scrap the casting which of course is a costly loss.

The present invention also has useful application in cleaning or restoring threads of stationary or permanent pipe installations that are capped by a threaded closure cap, such as access pipes to underground storage tanks or the like. On occasion, the internal pipe threads for the cap become damaged and must be repaired on the site for obvious reasons.

It has also been found that in some instances the nominal thread size for the interengaging parts i.e., the internal threads of the connecting element and external pipe threads are not within the prescribed tolerance limits and consequently the parts cannot be assembled for this reason. This, of course, may necessitate retapping the connecting element. Another alternative is to rethread the male pipe member if these threads are oversized in relation to the female threads of the connecting element.

Accordingly, it is an object of the present invention to provide a new and useful tool for repairing and restoring damaged threads.

It is also an object of the invention to provide such a tool which is portable and can be used by an operator independently of any automatic power actuating equipment.

A further object of the invention is to provide a tool which accommodates various thread sizes, types and diameters.

Another object is to provide such a tool which is simple, inexpensive and accurate.

SUMMARY OF THE INVENTION

These and other objects of the invention are achieved by the provision of a tool comprising a pair of elongated lever elements which are pivotally supported along their length on a link and mount at their thread cutting dies. The levers diverge outwardly from their pivotal connection to the link. The opposite ends of the levers define hand grip portions. The link is a bifurcated element and has a series of spaced pivot locations for screws so that the levers may be pivotally mounted to the link in various positions to accommodate internal threads of varying diameters.

An important feature of the present invention is the combined pivotal mounting of the levers to the link and the limited pivotal movement of the die blocks relative to the link member. This arrangement facilitates limited longitudinal movement of the link members relative to one another and is in effect a parallelogram-type action as opposed to a scissor-type action which allows adjustment of the die blocks to the pitch and taper of conventional spiral threads to insure good tracking of the die blocks in the threads. It also insures against damage to the threads.

The tool is used in the following manner. The hand grip portions are initially pivoted away from one another to position the thread dies in closely spaced adjacent relation. In this position, the dies may be inserted into a threaded opening in a connecting element such as an elbow or a T-joint. The hand grips are then pivoted to a closed position which firmly seats the thread dies in the thread track of the connecting element at diametrically opposed locations. Firm hand pressure is maintained on the hand grip portions and with the connecting element held in a stationary position, the tool is rotated to advance the cutting dies into the thread and affect the thread cleaning or cutting action. If only a localized area of the thread is damaged, the tool may be oscillated back and forth through a given arc until the burrs and damaged portion of the thread are restored. The levers may be pivotally mounted adjacent one extreme end of the link whereby the projecting portion of the link may be employed as an actuating arm to oscillate or rotate the tool. The link, thus, serves as a stabilizing element to insure good tracking of the cutting dies in the threads of the connecting element.

BRIEF DESCRIPTION OF FIGURES

These and other objects and features of the invention will be more readily understood from a consideration of the following detailed description, taken in connection with the accompanying drawings, in which:

FIG. 1 is a plan view of a thread cutting and restoring tool in accordance with the present invention;

FIG. 2 is a side elevational view thereof;

FIG. 3 is an enlarged sectional view through the link showing the pivotal connection of the lever to the link and taken on lines 3—3 of FIG. 1;

FIG. 4 is an enlarged sectional view taken on lines 4—4 of FIG. 1 showing the pivotal connection of the cutting die to the outer terminal end of the lever;

DESCRIPTION OF SPECIFIC EMBODIMENT

Figure 5:
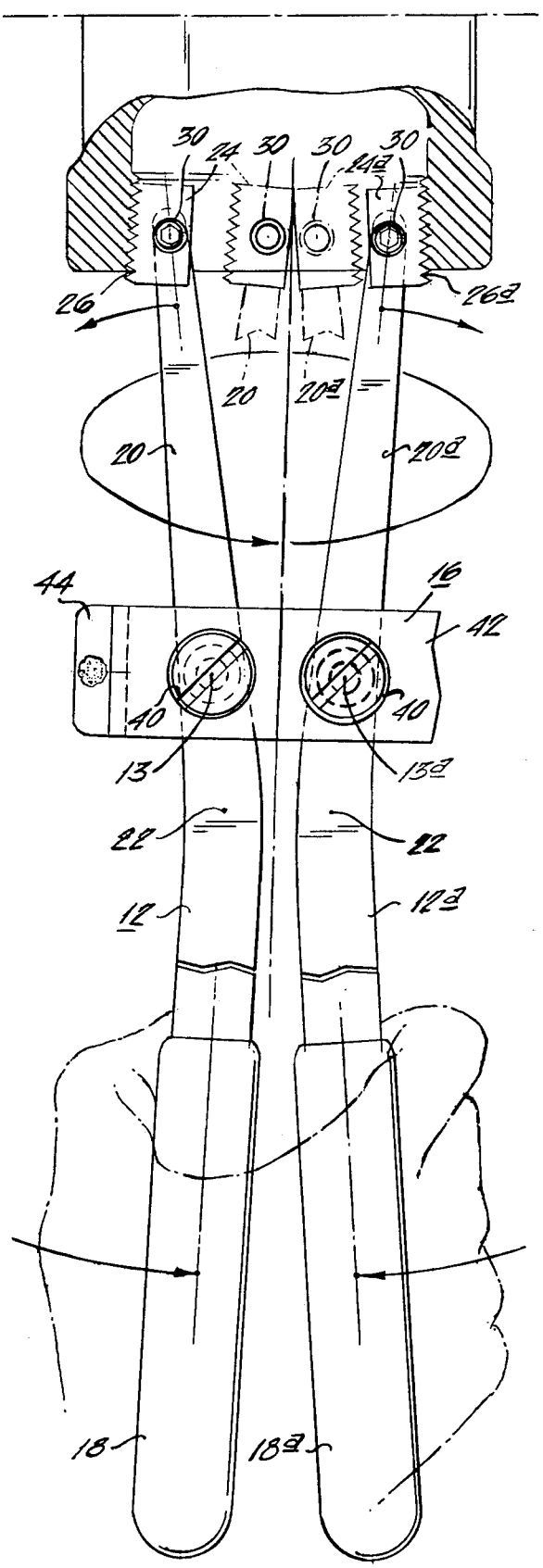
FIG. 5 is a fragmentary plan view partially in section showing the operating position of the tool.

Referring now to the embodiment of the invention illustrated in the drawings by way of example only, there is illustrated in FIG. 1 a thread cutting and cleaning tool made in accordance with the present invention which is generally designated by the numeral 10. The tool 10 comprises a pair of elongated lever members 12 and 12a which are pivotally secured at points 13, 13a spaced between their terminal ends to a link member 16. The levers, as illustrated, may be made of flat steel bar stock of generally rectangular cross section and comprise generally straight hand grip portions 18, 18a and offset, outwardly divergent die supporting segments 20, 20a. The pivotal mounting of the levers 12, 12a to the link 16 is in the present instance at a predetermined point forwardly of the juncture 22 of the hand grip portions and the outwardly divergent sections.

Thread cutting dies 24, 24a are mounted at the outer terminal ends of levers, the cutting dies as illustrated being generally rectangular, block-like elements having a series of serrations 26, 26a along one side edge thereof, the serrations of each of the blocks facing outwardly to confront and engage the internal threads of a connecting element in the manner illustrated in FIG. 5. In the present instance, the blocks are secured to the terminal ends of the finger portions of the tool by screw elements 30 permitting a certan degree of pivotal movement so that the cutting face of the die conforms more readily to the internal thread configuration and tracks better during the turning operation.

The cutting dies are easily interchangeable to accommodate different thread sizes and types with but a single tool. Even though the die blocks illustrated have only a single serrated face, they may be constructed of different shapes and provided with a plurality of thread cutting faces, each adapted for a different standard thread size and type. For example, the die block may be of generally square shape with each of the four sides having a serrated face and appropriately marked to indicate which face is suited for a given thread size and type. The pivotal mounting of the die block permits the user to simply rotate it to a desired position for a given thread size and type to be cut.

The die blocks can be pivotally mounted in a variety of ways. In the present instance, the screw element 30 for pivotally mounting the die blocks comprises an enlarged head 32, an unthreaded central section 34 of smaller diameter and a terminal threaded tip portion 36 of reduced diameter. The central section 34 is of an axial length $La$ slightly greater than the thickness T of the die block to permit turning of the same during a cutting operation.

The link 16, in the present instance, has a series of pivot locations for the levers which as illustrated are pivotally mounted to the link by means of screw fasteners 40. The link 16 comprises two strap-like elements 42 and 42a which have inwardly offset terminal end portions 44, 44a by which they are secured together, for example, by welding and defined therebetween as illustrated in FIG. 3, a through opening 46 for the levers. Each of the strap elements is provided with lined openings to accommodate the screw fasteners for pivotally mounting the levers 12 and 12a. As illustrated, each strap has a series of three longitudinally spaced tapped holes 48 and a series of three longitudinally spaced untapped openings 50 of larger diameter. This arrangement simplifies production and assembly of the link member since only a single strap pattern is needed and upon assembly they are inverted and superimposed so that the larger through openings 50 of one strap align with the tap openings 48 in the other strap. In this fashion when the levers are mounted at one end of the strap, both of the screw fasteners 40 to pivotally secure the levers to the link are inserted through one strap and threadedly engaged in the opposite strap. If a greater spacing is required, for example, to mount the levers at the number 1 and the number 4 positions, one of the screw fasteners is simply inserted from the other side. This arrangement of the screw elements on either side of the strap also applies when the levers are mounted in the number 3 and 4 positions on the link.

The fastener 40 is generally similar to the one mounting the die blocks and includes an enlarged head 60 slotted to receive a screw driver, two unthreaded sections 62, 64 of progressively smaller diameter to define a circumferential shoulder 66 engaging the face of a strap around an unthreaded opening and a threaded tip 68 which mates with the threaded strap hole. The section 64 is of an axial length $Lb$ slightly greater than the combined width of the strap and lever to insure free pivotal movement of the lever when the screw fastener is turned to its fully seated position.

Considering now briefly the use of the tool and with particular reference to FIG. 5, the handle portions of the levers are spread apart to position the die blocks together. The tool is then positioned so that the cutting faces confront the internal threads, hand pressure applied and the tool rotated to cut the threads.

Figure 6:
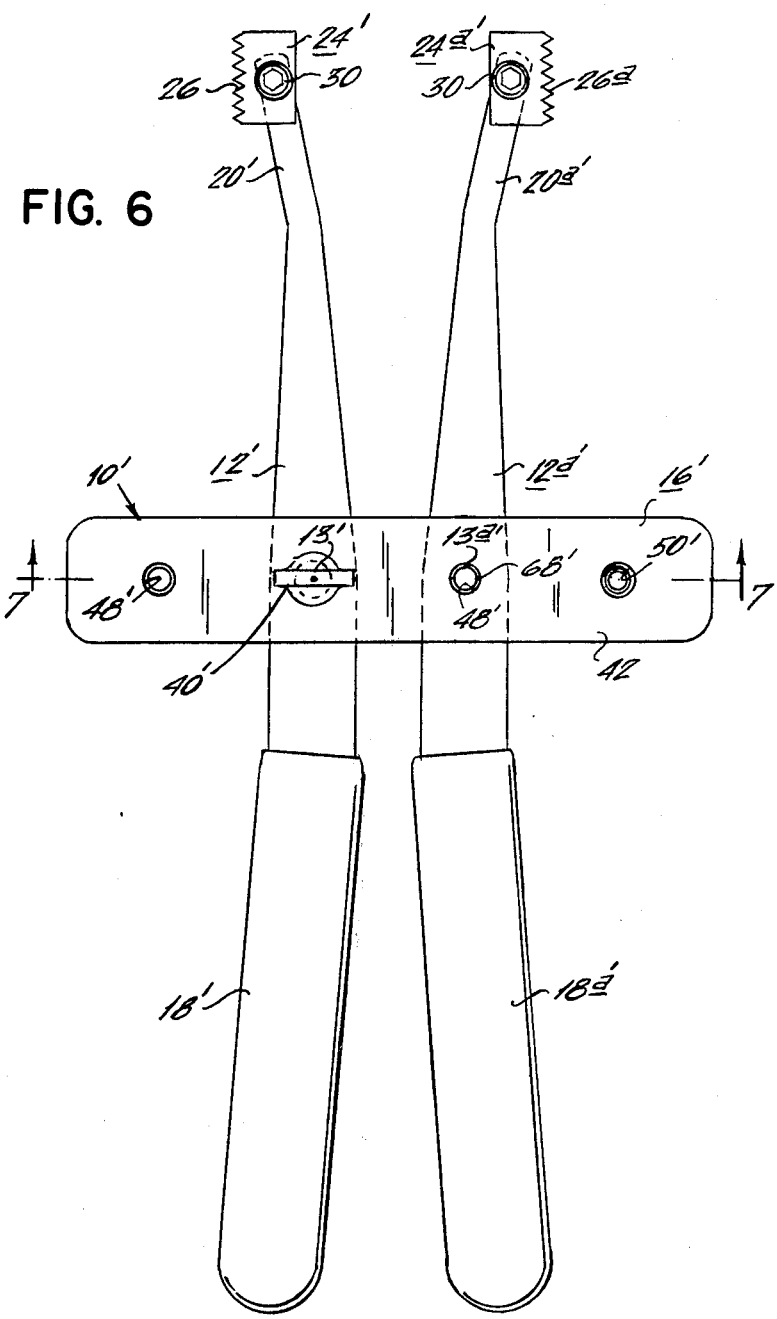
FIG. 6 is a plan view of another embodiment of thread cleaning and restoring tool in accordance with the present invention.
Figure 7:
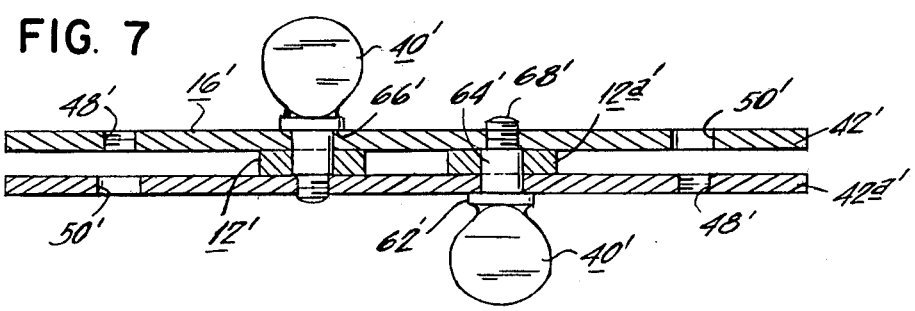
FIG. 7 is a sectional view through the link member taken on lines 7—7 of FIG. 6.

There is illustrated in FIGS. 6 and 7 another embodiment of thread cleaning and restoring tool in accordance with the present invention generally designated by the numeral 10'. The general arrangement and operation of the tool are similar to the previously described embodiment. Thus, the tool includes a pair of alongated levers 12', 12a' having at one terminal end hand grip portions 18', 18a' and mounting at their opposite terminal ends serrated die blocks 24', 24a'. In the present instance, the levers are pivotally mounted to the link 16' at a point approximately midway of their length.

In this embodiment, the die blocks are pivotally mounted to the terminal ends of the links by conventional screw members and a standard lock washer is interposed between the die block and the lever. This arrangement insures a firm mounting of the die block and permits a limited pivotal action.

The link, as illustrated, comprises a pair of separable elongated flat bar members each having a series of through holes 50' and a series of smaller tapped holes 48' at longitudinally equi-spaced points along the bar. The bars are superimposed in the assembled relation so that the through holes of one bar and tapped holes of the other are aligned. In this fashion, a wing screw fastening element 40' of the type illustrated is simply inserted through the large hole in one bar, an opening 41' in the lever so that the threaded stud portion engages in the tapped opening of the other bar. The wing screw has an annular flange 62' at the juncture of the head and an enlarged section 64' above the threaded shank which bottoms out against the one bar in the assembled relation. The section 64' is preferably of an axial length greater than the combined thickness of one bar of the link and lever to permit the desired pivotal movement of the lever relative to the link. This link and fastening arrangement is somewhat more simplified and less expensive to manufacture than the previously described embodiment. Nevertheless, it permits the parallelogram-type action to facilitate relative longitudinal displacement of the levers to insure good tracking of the die serrations in the spiral threads of the connecting element or the like. As noted above, this action is important to insure good cutting of the threads without damaging the same.

There has, therefore, been provided a simple, inexpensive but truly useful tool for reconditioning damaged threads or cleaning the same.

Thus, while the invention has been described with particular reference to a specific embodiment, it will be understood that it may be embodied in a variety of forms diverse from those specifically shown and described without departing from the spirit and scope of the invention as defined by the apended claims.

I claim:

1. A tool for cutting and restoring internal threads of a connecting element or the like comprising a pair of elongated levers each lever having a hand grip portion at one end, at least one link member pivotally connected to each of the levers at predetermined locations spaced longitudinally from opposite terminal ends thereof, a die block having a serrated face pivotally connected to the terminal end of each lever at a point remote from the hand grip portion.

2. A tool as claimed in claim 1 wherein said lever comprises an elongated relatively straight hand grip portion and forward sections disposed at an angle to said hand grip portions, the forward sections of said pair of levers diverging upwardly and outwardly relative to one another when the hand grip portions are in parallel relationship.

3. A tool as claimed in claim 1 wherein said link member comprises a pair of elongated strap elements having offset terminal end portions secured together to define a space therebetween slightly greater than the thickness of a lever and including a plurality of spaced aligned openings in the strap members to receive fastening means for pivotally mounting the levers thereto.

4. A tool as claimed in claim 3 wherein each said strap member has a series of tapped openings and a series of larger untapped openings, the tapped openings of one bar element being aligned with the untapped openings of the other bar element and wherein said pivotal fastening elements include a threaded tip portion threadedly received in the tapped holes in the bar members.

5. A tool as claimed in claim 4 wherein said fastening element includes an enlarged head portion, a reduced section engageable through the untapped openings of an axial depth slightly greater than the combined thickness of one bar element and said lever.

6. A tool as claimed in claim 1 wherein said link comprises a pair of elongated separate strap elements having openings to accomodate fastening means for pivotally securing the levers between the strap elements.

7. A tool as claimed in claim 1 including means defining a series of spaced openings along the length of said link member and including fastening means engaging through said openings to pivotally connect said link member to said levers at selected locations along the length of said link member.

8. A tool as claimed in claim 1 wherein each lever comprises a generally straight hand grip portion and an offset angled die supporting segment and wherein the link member is pivotally connected to the levers at a point forwardly of the juncture of the hand grip portion and outwardly angled die supporting segment.

* * * * *